US012674680B2

(12) United States Patent
    Li et al.

(10) Patent No.: US 12,674,680 B2
(45) Date of Patent: Jul. 7, 2026

(54) URBAN TRAFFIC VELOCITY ESTIMATION METHOD BASED ON MULTI-SOURCE CROWD SENSING DATA

(71) Applicant: ZHEJIANG UNIVERSITY, Zhejiang (CN)

(72) Inventors: Chao Li, Zhejiang (CN); Yingqian Zhang, Zhejiang (CN); Shibo He, Zhejiang (CN); Jiming Chen, Zhejiang (CN); Yi Fang, Zhejiang (CN); Qinmin Yang, Zhejiang (CN); Peng Cheng, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 113 days.

(21) Appl. No.: 18/727,108

(22) PCT Filed: May 11, 2023

(86) PCT No.: PCT/CN2023/093404
    § 371 (c)(1),
    (2) Date: Jul. 8, 2024

(87) PCT Pub. No.: WO2024/183151
    PCT Pub. Date: Sep. 12, 2024

(65) Prior Publication Data
    US 2025/0102316 A1        Mar. 27, 2025

(30) Foreign Application Priority Data
    Mar. 9, 2023    (CN) .......................... 202310221863.0

(51) Int. Cl.
    *G01C 21/36*        (2006.01)
    *G08G 1/01*        (2006.01)
    *G08G 1/052*        (2006.01)

(52) U.S. Cl.
    CPC ....... *G01C 21/3691* (2013.01); *G08G 1/0129* (2013.01); *G08G 1/052* (2013.01)

(58) Field of Classification Search
    CPC .. G01C 21/3691; G08G 1/0129; G08G 1/052; G08G 1/0112; G08G 1/0116;
    (Continued)

(56) References Cited

U.S. PATENT DOCUMENTS

| | | | |
|---|---|---|---|
| 2007/0208501 A1 | 9/2007 | Downs et al. | |
| 2011/0106416 A1* | 5/2011 | Scofield ............... | G08G 1/0104 |
| | | | 701/119 |
| 2023/0146119 A1* | 5/2023 | Chen ...................... | G05D 1/024 |
| | | | 701/27 |

FOREIGN PATENT DOCUMENTS

| | | |
|---|---|---|
| CN | 102737510 | 10/2012 |
| CN | 104217593 | 12/2014 |

(Continued)

OTHER PUBLICATIONS

Jiping Xing, "Study on the Urban Network Volume Estimation Based on Multi-Source Data Fusion", Southeast University For the Academic Degree of Doctor of Engineering, with English abstract, Jan. 2021, pp. 1-160.

(Continued)

*Primary Examiner* — Rami Khatib
(74) *Attorney, Agent, or Firm* — JCIPRNET

(57) ABSTRACT

The present invention discloses an urban traffic velocity estimation method based on multi-source crowd sensing data. This method, based on roadside pedestrian data and road navigation data collected by smart phones, obtains a final estimated velocity through the steps of missing data filling, self-view velocity aggregation and multi-view velocity fusion. This fine-grained large-scale urban traffic velocity estimation method can achieve velocity estimation on all types of roads, including suburban road sections and paths, instead of just focusing on main roads in a city center. According to the present invention, based on data driving, the urban traffic velocity estimation method does not need to (Continued)

Acquiring crowd sensing data

Preprocessing a data set

Calculating an average velocity

Filling in missing data

Self-view velocity aggregation

Multi-view velocity aggregation

Outputting a final estimated velocity install additional devices on roads, and is low in cost and high in universality. Compared with the prior art, the urban traffic velocity estimation method has higher practicability, theoretical property and applicability, and is of great significance for improving traffic management and planning.

5 Claims, 3 Drawing Sheets

(58) Field of Classification Search
CPC .. G08G 1/0133; G08G 1/0141; G08G 1/0104; G06F 16/215
See application file for complete search history.

(56) References Cited

FOREIGN PATENT DOCUMENTS

| | | | | |
|----|----------------|---|---------|-----------------|
| CN | 102289935 B | * | 12/2015 | .......... G08G 1/0104 |
| CN | 105513359 | | 4/2016 | |
| CN | 108335482 | | 7/2018 | |
| CN | 109410586 | | 3/2019 | |
| CN | 113538898 A | * | 10/2021 | ............. G08G 1/012 |
| CN | 114120635 | | 3/2022 | |
| CN | 114445252 | | 5/2022 | |
| CN | 114925836 | | 8/2022 | |

OTHER PUBLICATIONS

Rong Zhang et al., "Hybrid Traffic Speed Modeling and Prediction Using Real-world Data", 2015 IEEE International Congress on Big Data, Jun. 27, 2015-Jul. 2, 2015, pp. 230-237.
"Written Opinion of the International Searching Authority (Form PCT/ISA/237) of PCT/CN2023/093404," mailed on Dec. 4, 2023, pp. 1-4.
"International Search Report (Form PCT/ISA/210) of PCT/CN2023/093404," mailed on Dec. 4, 2023, pp. 1-5.

* cited by examiner

1

URBAN TRAFFIC VELOCITY ESTIMATION METHOD BASED ON MULTI-SOURCE CROWD SENSING DATA

CROSS-REFERENCE TO RELATED APPLICATION

This application is a 371 of international application of PCT application serial no. PCT/CN2023/093404, filed on May 11, 2023, which claims the priority benefit of China application serial no. 202310221863.0, filed on Mar. 9, 2023. The entirety of each of the above-mentioned patent applications is hereby incorporated by reference herein and made a part of this specification.

TECHNICAL FIELD

The present invention relates to an urban traffic velocity estimation method, and in particular to a traffic velocity estimation method based on multi-source crowd sensing data.

BACKGROUND

Fine-grained large-scale urban traffic velocity estimation is of great significance to urban traffic management and improvement. Traditional coarse-grained traffic velocity estimation is only based on a limited number of traffic sensors to calculate a velocity of a road section in a small range. Nowadays, mobile phones have been used more and more for navigation purposes. When users of the mobile phones use maps or taxi APPs, service providers will record GPS coordinates. The road mobile navigation data has become an important data source for traffic monitoring and sensing, and is widely used in traffic state estimation. However, a spatial coverage of mobile navigation data is uneven, and usually more data will be collected in hot spots and little or no data is collected in suburbs, thus it is impossible to implement fine-grained traffic velocity estimation. In addition to the mobile navigation data obtained for a navigation purpose, when users use mobile applications such as Weibo and Meituan, location-based services are involved, and many pedestrians on the roadside use mobile phones while walking. Meanwhile, when some pedestrians use the mobile phone applications with location-based services, they will randomly scan WIFI signals of nearby vehicles and report their current locations. WIFI signals of vehicles can be filtered through WIFI lists reported by pedestrians, and the locations of the vehicles can be approximated according to the locations of the pedestrians on the roadside. The obtained data can cover more sidewalk aspects without deploying any additional device. Therefore, it is possible to fuse roadside pedestrian data and road mobile navigation data to obtain fine-grained large-scale urban traffic velocity estimation in a low-cost and accurate way.

SUMMARY

An object of the present invention is to propose an urban traffic velocity estimation method based on multi-source crowd sensing data to improve and standardize existing research and technologies. This method puts forward an overall data processing flow for the traffic velocity estimation method, which can promote urban traffic planning and management and has a practical value.

An object of the present invention is achieved by the following technical solution.

An urban traffic velocity estimation method based on multi-source crowd sensing data includes the following steps:

step 1, data set preprocessing: cleaning an original data set collected by smart phones to obtain roadside pedestrian data and road navigation data respectively;

step 2, average velocity calculation: calculating a current velocity X of each road section in different time periods by using the data set in step 1;

step 3, missing data filling: by using the current velocity X of each road section in different time periods obtained in step 2, in combination with a historical velocity H of each road section in different time periods, filling missing velocity data in X to obtain a filled velocity $\hat{X}$;

step 4, self-view velocity aggregation: by using the filled velocity $\hat{X}$ calculated in step 3, quantizing spatial dependences between different road sections according to the historical velocity H, and collecting useful neighbor information to obtain an aggregated roadside pedestrian velocity data $V_d$ and road mobile navigation velocity data $V_w$;

step 5, multi-view velocity fusion: according to the aggregated roadside pedestrian velocity data $V_d$ and the road mobile navigation velocity data $V_w$, fusing multi-source velocity data by using a multi-layer perceptron (MLP) according to a determination whether a time stamp and current velocity data are filled data or not, to obtain a fusion velocity Y, and finally correcting the fusion velocity according to a feature of a road type to obtain fine-grained large-scale urban traffic estimated velocity $\hat{Y}'$.

Further, step 1 specifically includes: obtaining the road navigation data by filtering an APP usage list in original data, that is, personal position data reported when users use programs such as Gaode Map Navigation and Didi; and by filtering a scanned WIFI signal list in the original data, obtaining the roadside pedestrian data according to a determination whether there is a vehicle-mounted WIFI signal in the list, which means that when a user inadvertently scans the WIFI signal of a passing vehicle when using a mobile phone and reports a personal position, a roadside pedestrian position is approximately regarded as a driving vehicle position.

Further, step 2 specifically includes: by using the data obtained by cleaning and filtering in step 1, projecting trajectory data into a road network by using a hidden Markov road network matching algorithm, so as to obtain the current velocity X of each road section in different time periods, where the hidden Markov road network matching algorithm is also called a hidden Markov model map matching algorithm, which is the known art.

Further, step 3 specifically includes: firstly, introducing a mask matrix M to represent a missing unit of the velocity X:

$$M_{i,j} = \begin{cases} 1, \text{ if } X_{i,j} \text{ is available} \\ 0, \text{ if } X_{i,j} \text{ is missing} \end{cases}$$

secondly, establishing a historical velocity matrix H by using historical data to provide additional information to help fill in missing data, and introducing another mask matrix N to represent a missing unit of H:

$$N_{i,j} = \begin{cases} 1, & \text{if } H_{i,j} \text{ is available} \\ 0, & \text{if } H_{i,j} \text{ is missing} \end{cases}$$

defining a weighted matrix W to measure an importance of each item in the historical velocity matrix H, and then performing matrix decomposition by using H, W, M, N and X:

$$\text{Loss}_h(W) = \frac{1}{2}\|W \odot N \odot (H - UV^T)\|^2 + \lambda\|U\|^2 + \lambda\|V\|^2$$

$$U^+(W) = U - \alpha\frac{\partial \text{Loss}^h(W)}{\partial U}$$

$$V^+(W) = V - \alpha\frac{\partial \text{Loss}^h(W)}{\partial V}$$

then constructing a loss by the matrix decomposition based on the updated $U^+$ and $V^+$:

$$\text{Loss}_t(W) = \frac{1}{2}\|M \odot (X - U^+(V^+)^T)\|^2 + \lambda\|U^+\|^2 + \lambda\|V^+\|^2$$

then updating a weight W:

$$W^+ = W - \beta\frac{\partial \text{Loss}^t}{\partial W}$$

where, $\alpha$ and $\beta$ are learning rate parameters; and after iterative updating, obtaining a learned weighted matrix W, X and H being able to be used simultaneously to estimate the missing data $\hat{X}$:

$$\min_{U,V}\frac{1}{2}\|M \odot (H - UV^T)\|^2 + \frac{1}{2}\|W \odot N \odot (H - UV^T)\|^2 + \lambda\|U\|^2 + \lambda\|V\|^2$$

$$\hat{X} = M \odot X + (1 - M) \odot UV^T$$

where, $\lambda$ represents a penalty item parameter, and U and V represent two sub-matrices decomposed from an original matrix.

Further, the step 4 specifically includes: capturing a spatial correlation between adjacent roads by using the self-view velocity aggregation, and aggregating information of neighbor road sections highly correlated to a central road section; firstly, calculating a spatial correlation $e_{i,j}$ between a road section i and a road section j according to the historical velocity matrix, and keeping highly correlated parts and ignoring irrelevant information:

$$e'_{i,j} = \sqrt{\sum(H_{i,:} - H_{j,:})^2}, \ j \in \text{the set of neighboring connected roads for } i$$

$$e_{i,j} = \begin{cases} +\infty, & e'_{i,j} \geq \text{threshold} \\ e'_{i,j}, & e'_{i,j} \leq \text{threshold} \end{cases}$$

then, calculating a fusion coefficient $a_{i,j}$ between the road sections according to the spatial correlation $e_{i,j}$, and then obtaining the roadside pedestrian velocity data $V_d$ and the road mobile navigation velocity data $V_w$ after the self-view aggregation:

$$a_{i,j} = \frac{\exp(-e_{i,j}/k)}{\sum_{j=N_i}\left(-\frac{e_{i,j}}{k}\right) + \varepsilon}$$

$$V_{i,} = \left(1 - \sum_{j=N_i}\frac{a_{ij}}{2}\right) * \hat{X}_{i,:} + \sum_{j=N_i}\frac{a_{ij}}{2} * \hat{X}_{j,:}$$

where, $\varepsilon$ represents a minimal constant to prevent an overflow, k represents a constant scaling value, $N_i$ represents a set of neighboring connected road sections i, and $V_i$, uniformly represents a feature representation of an i-th row, i.e., road section i of the roadside pedestrian velocity data $V_d$ and the road mobile navigation velocity data $V_w$, which will not be described separately.

Further, step 5 specifically includes: effectively fusing multi-source data by using multi-view velocity fusion, according to a determination whether a feature representing the time stamp is a filled data feature $F_d$ and whether the current velocity data is a filled data feature $F_w$, then passing the features through an embedding layer and splicing the features, and according to the aggregated roadside pedestrian velocity data $V_d$ and road navigation velocity data $V_w$ obtained in step 4, obtaining the fusion velocity $\hat{Y}$ through the multi-layer perceptron (MLP):

$$Z = \text{Embedding}(\text{Concat}(F_d, F_w))$$

$$\hat{Y} = \text{MLP}(\text{Concat}(Z, V_d, V_w))$$

finally, correcting the estimated velocity according to an external factor (i.e., the road type), easily obtaining a velocity distribution of each type of road according to the historical data, regarding the velocity distribution as a normal distribution, and correcting the velocity falling at a tail of the distribution to obtain a final estimated velocity $\hat{Y}'$.

Compared with the prior art, the present invention has the following innovative advantages and remarkable effects:

1) the present invention integrates data from multiple sources, fuses roadside pedestrian data and road navigation data, implements velocity estimation with 100% coverage of all road sections of the road network, fills in more than 70% of missing data, greatly reduces the cost of velocity estimation, and does not require the additional installation of devices such as a loop detector or camera which costs tens of thousands yuan;

2) the present invention proposes a standardized processing flow for data, and the specific implementation of each step can be changed, so that the flexibility and expansibility are high.

DETAILED DESCRIPTION

Figure 1:
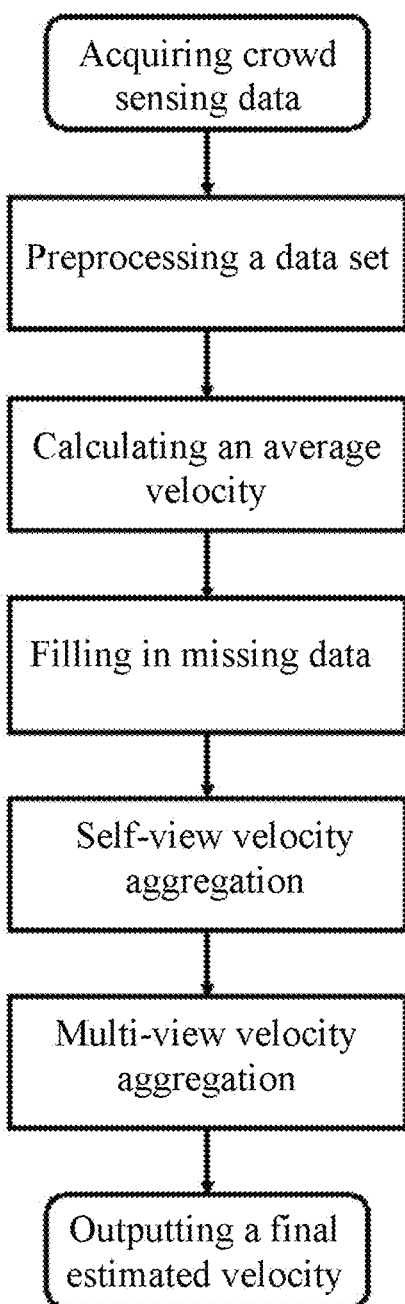
FIG. 1 is a flowchart of a fine-grained large-scale urban traffic velocity estimation method of the present invention.

Specific implementation method and working principles of the present invention will be described in detail below with reference to the attached drawings.

Embodiment

In this embodiment, user data acquired from a certain place and collected from Mar. 21, 2020 to Mar. 28, 2020 are processed, and a data collection process is anonymously protected. Specific variables included in a data set are shown in Table 1:

TABLE 1

| Crowd sensing data set | |
| --- | --- |
| Variable name | Variable description |
| Gid | User ID |
| Timestamp | User reporting time |
| Lon | User longitude |
| Lat | User dimension |
| APP list | User APP usage list |
| WIFI list | User scanned WIFI list |

In this embodiment, an implementation data set for implementing fine-grained large-scale urban traffic velocity estimation is the above-mentioned user data in a certain place, and the detailed implementation steps are as follows:

Step 1, cleaning an original data set in Table 1, deleting duplicate records, etc., and obtaining road mobile navigation data by filtering an APP usage list in original data and screening navigation application programs such as Didi, Gaode Map, etc. The roadside pedestrian data is obtained by filtering the scanned WIFI list and screening the data containing vehicle WIFI signals.

Step 2, by using the data obtained by cleaning and filtering in the step 1, projecting trajectory data into a road network by using a hidden Markov road network matching algorithm, so as to obtain the current velocity X of each road section in different time periods. Then, the example calculates road coverages of different data sets from 8:00 am to 8:30 am, as shown in Table 2. Each item in the table represents the coverage of a different type of road section in a different data set during the illustrated time period. The greater the coverage is, the little the data missing is.

TABLE 2

| Comparison of road coverages of different data sets from 8:00 am to 8:30 am | | |
| --- | --- | --- |
| Road type | Road navigation data | Roadside pedestrian data |
| All road sections | 80.14% | 81.52% |
| Main road | 92.26% | 91.44% |
| Secondary road | 87.65% | 88.24% |
| Tertiary road | 79.76% | 83.49% |
| Other roads | 70.00% | 70.79% |

By comparison, it is found that coverage situations of different data are different, and the data is dominant in different road sections rather than always performing better in all road sections. The road mobile navigation data is mainly concentrated in the main road, while mobile roadside data is more evenly distributed.

Step 3, performing data filling on the current velocity X of each road section in different time periods obtained in the step 2, and estimating missing velocity data of recorded road sections on Mar. 28, 2020 in an example. In order to provide additional velocity mode information, road mobile navigation data and roadside pedestrian data from Mar. 21, 2020 to Mar. 27, 2020 are used as historical data. After calculation, the data of road mobile navigation and roadside pedestrian data on the same day are 74.5% and 76.8% respectively. Specifically, this embodiment adopts a learning rate $\alpha$ of 1e-4 and a learning rate $\beta$ of 1e-4, and $\beta1$ is 0.9 and $\beta2$ is 0.999 in an Adam optimizer. In the example, firstly, normal matrix decomposition is pre-trained in 10K steps to get a good initialization, and then a meta-learning process of a weighted matrix is run in 30K steps. Finally, the matrix decomposition process based on the weighted matrix is trained in 10K steps, and the proposed method is compared with ordinary matrix decomposition, tensor decomposition, linear difference method, GAIN and KNN filling methods, and experimental results are shown in Table 3:

TABLE 3

| Comparison of data filling effects of different methods | | | | | | |
| --- | --- | --- | --- | --- | --- | --- |
| | Road mobile navigation data | | | Roadside pedestrian data | | |
| Model | MAE | RMSE | MAPE | MAE | RMSE | MAPE |
| Original data | 8.538 | 11.242 | 28.134 | 9.223 | 12.043 | 30.990 |
| Ordinary matrix decomposition | 8.463 | 11.255 | 27.509 | 9.072 | 11.920 | 29.924 |
| Linear interpolation | 8.830 | 11.745 | 29.016 | 9.470 | 12.396 | 31.430 |
| KNN filling | 8.543 | 11.312 | 27.757 | 9.282 | 12.138 | 30.698 |
| GAIN | 8.941 | 12.078 | 29.108 | 10.315 | 13.875 | 33.094 |
| Tensor decomposition | 8.590 | 11.235 | 30.261 | 9.150 | 11.881 | 32.616 |
| Example method | 8.816 | 10.828 | 26.690 | 8.812 | 11.521 | 29.014 |

In the table, MAE represents a mean absolute error, RMSE represents a root mean square error, and MAPE represents a mean absolute percentage error. The lower an error value is, the better the method is. From the table, it can be seen that the method proposed in this embodiment has the lowest mean error value compared with other models under various error evaluation standards, which is obviously superior to other methods and has a good effect of filling missing data.

Step 4, capturing a spatial correlation between adjacent roads by using the self-view velocity aggregation, and aggregating information of neighbor road sections highly correlated to a central road section. First of all, this embodiment calculates a spatial correlation between road sections according to a historical velocity matrix, and keeps highly correlated parts and ignores irrelevant information:

$$e'_{i,j} = \sqrt{\sum (H_{i,:} - H_{j,:})^2}, \ j \in \text{the set of neighboring connected roads for } i$$

$$e_{i,j} = \begin{cases} +\infty, & e'_{i,j} \geq \text{threshold} \\ e'_{i,j}, & e'_{i,j} \leq \text{threshold} \end{cases}$$

Figure 2:
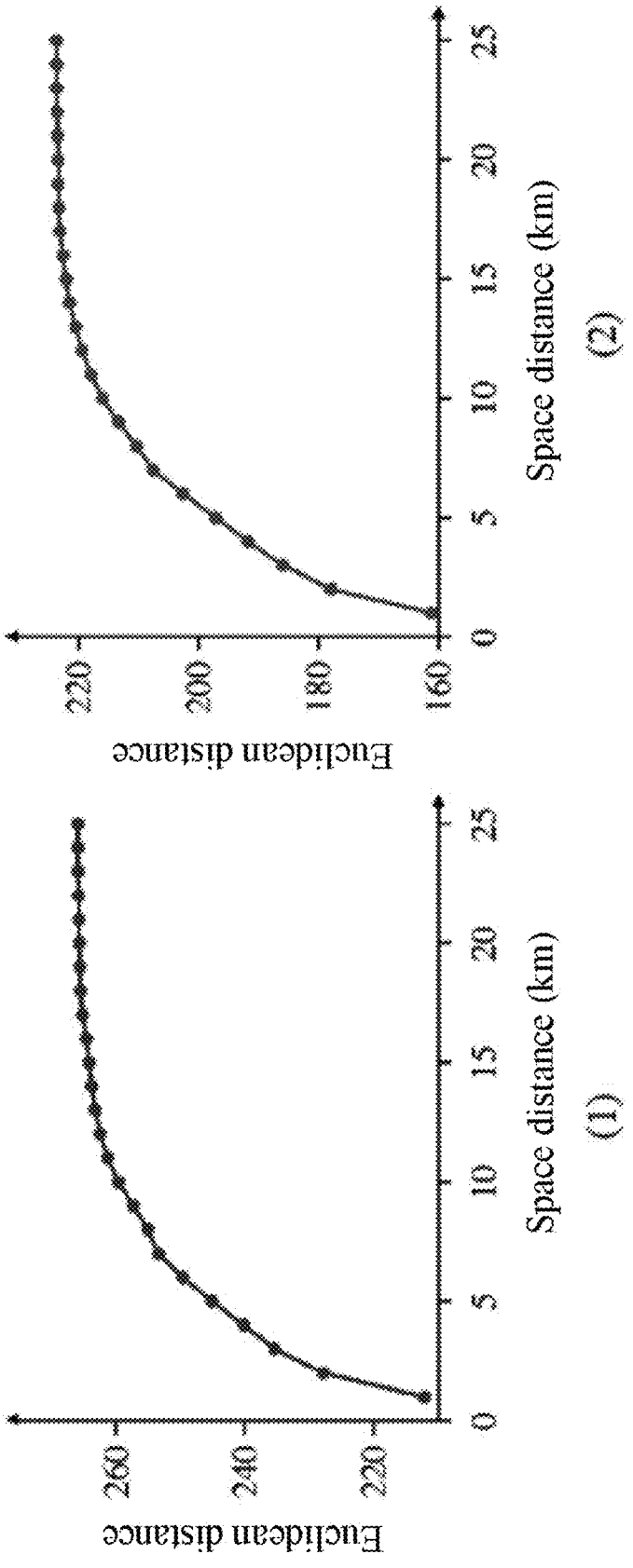
FIG. 2 is a schematic diagram of the correlation of neighbor road sections in step 3 applied to an embodiment of the present invention, in which (1) represents a road mobile navigation data, and (2) represents roadside pedestrian data.

As shown in FIG. 2, the closer a geographical distance of each road section is, the greater a velocity similarity is; meanwhile, the farther the distance is, the greater a difference is.

Then, in this embodiment, a fusion coefficient $a_{i,j}$ between road sections is calculated according to the spatial correlation, and the velocity V after self-view aggregation is obtained:

$$a_{i,j} = \frac{\exp(-e_{i,j}/k)}{\sum_{j=N_I}\left(-\frac{e_{i,j}}{k}\right) + \varepsilon}$$

$$V_{i,} = \left(1 - \sum_{j=N_i}\frac{a_{ij}}{2}\right) * \hat{X}_{i,:} + \sum_{j=N_i}\frac{a_{ij}}{2} * \hat{X}_{j,:}$$

Figure 3:
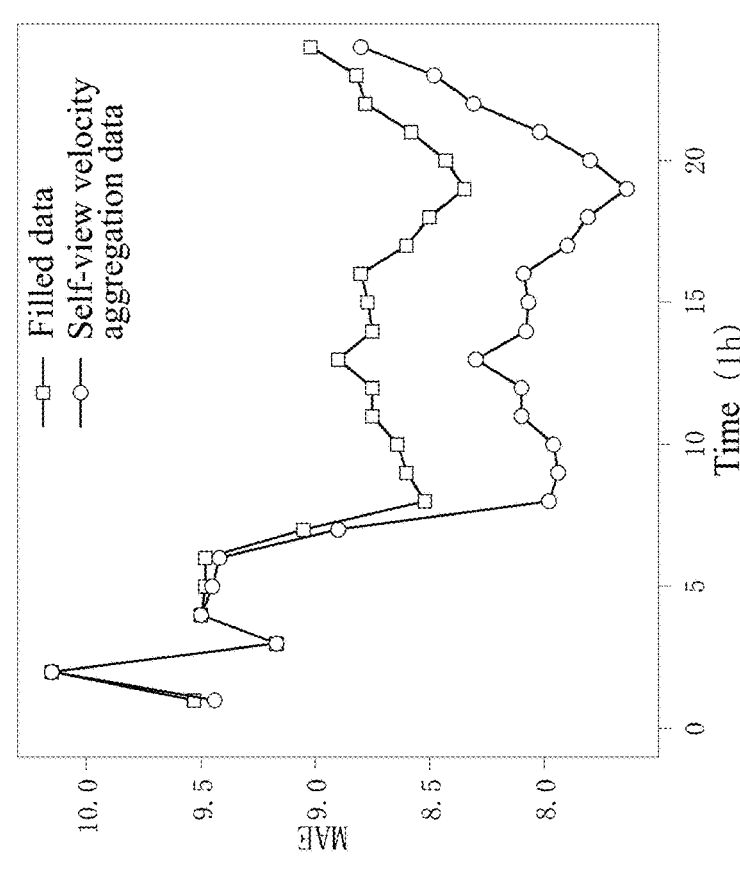
FIG. 3 is a schematic diagram of improving the accuracy of self-view velocity aggregation in step 3 applied to an embodiment of the present invention, in which (1) represents road mobile navigation data and (2) represents roadside pedestrian data.
Figure 3:
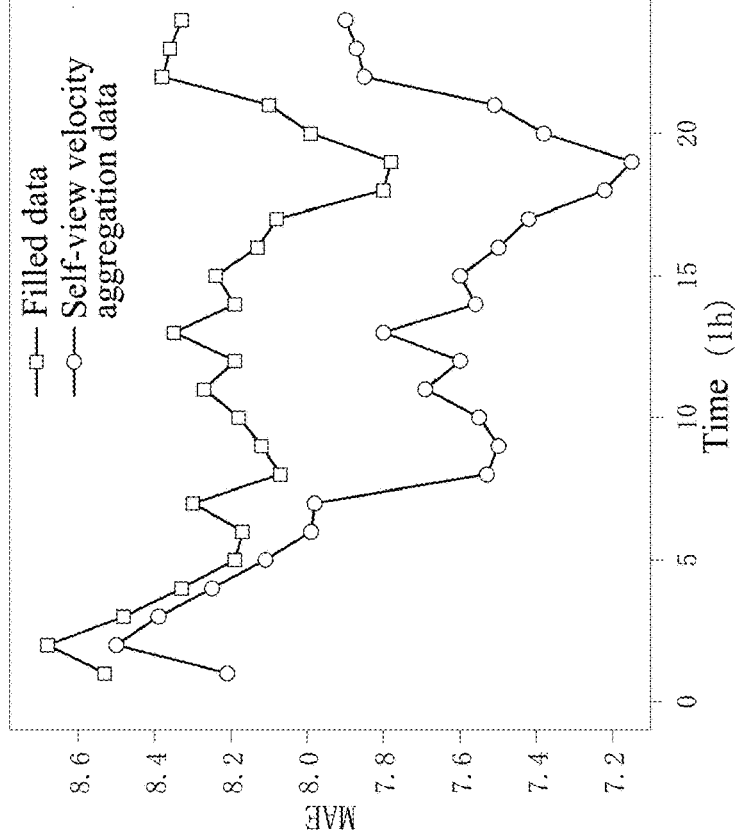

As shown in FIG. 3, the aggregation method proposed in this embodiment can improve the velocity estimation accuracy of intermediate sections by combining information of neighbor road sections well.

Step 5, based on the data subjected to self-view aggregation in the step 4, multi-view velocity fusion is adopted to effectively fuse multi-source data, and the estimated velocity is corrected according to an external factor, that is, the road type. The results are shown in Table 4:

TABLE 4

| Comparison of data fusion effects of different methods | | | |
|---|---|---|---|
| Model | MAE | RMSE | MAPE |
| Weighted mean | 7.896 | 10.459 | 25.706 |
| Gradient iteration | 7.635 | 10.197 | 25.340 |
| Linear regression | 7.467 | 10.094 | 25.901 |
| Enhanced decision tree | 7.345 | 9.740 | 25.779 |
| Example method | 7.320 | 9.837 | 23.877 |

It can be seen from the table that the error value of the method proposed by the present invention is smaller than that by other models under three evaluations, so that the method has an obvious better effect than other methods, and has a good data fusion effect.

The above description are only embodiments of the present invention. Although the present invention has been described with reference to preferred embodiments, it should be understood that the present invention is not limited to the disclosed embodiments. Those skilled in the art can make many possible variations and modifications to the disclosed solution, or to modify the embodiments to equivalent embodiments, without departing from the scope of the technical solution of the present invention, using the methods and technical contents disclosed above. Therefore, any simple changes, equivalent variations and modifications made to the above embodiments according to the technical essence of the present invention are within the scope of the technical solution of the present invention, without departing from the content of the technical solution of the present invention.

What is claimed is:

1. An urban traffic velocity estimation method based on multi-source crowd sensing data, comprising the following steps:

step 1, data set preprocessing: filtering, by a processor, an original data set collected by smart phones to obtain roadside pedestrian data and road navigation data respectively;

step 2, average velocity calculation: calculating, by the processor, a current velocity X of each road section in different time periods by using the preprocessed data set in the step 1;

step 3, missing data filling: by using the current velocity X of each road section in different time periods obtained in the step 2, in combination with a historical velocity H of each road section in different time periods, filling, by the processor, missing data in X to obtain a filled velocity $\hat{X}$, reducing cost of velocity estimation, and does not require additional installation of devices;

wherein the step 3 specifically comprising:

firstly, introducing a mask matrix M to represent a missing unit of the velocity X:

$$M_{i,j} = \begin{cases} 1, & \text{if } X_{i,j} \text{ is available} \\ 0, & \text{if } X_{i,j} \text{ is missing} \end{cases}$$

secondly, establishing a historical velocity matrix H by using historical data to provide additional information to help fill in missing data, and introducing another mask matrix N to represent a missing unit of the historical velocity matrix H:

$$N_{i,j} = \begin{cases} 1, & \text{if } H_{i,j} \text{ is available} \\ 0, & \text{if } H_{i,j} \text{ is missing} \end{cases}$$

where $_i$ and $_j$ represent road section, defining a weighted matrix W to measure an importance of each item in the historical velocity matrix H, and then performing matrix decomposition by using H, W, M, N and X:

$$\text{Loss}_h(W) = \frac{1}{2}\left\|W \odot N \odot (H - UV^T)\right\|^2 + \lambda\|U\|^2 + \lambda\|V\|^2$$

$$U^+(W) = U - \alpha\frac{\partial \text{Loss}^h(W)}{\partial U}$$

$$V^+(W) = V - \alpha\frac{\partial \text{Loss}^h(W)}{\partial V}$$

then constructing a loss by the matrix decomposition based on the updated $U^+$ and $V^+$:

$$\text{Loss}_t(W) = \frac{1}{2}\left\|M \odot (X - U^+(V^+)^T)\right\|^2 + \lambda\|U^+\|^2 + \lambda\|V^+\|^2$$

then updating a weight W:

$$W^+ = W - \beta\frac{\partial \text{Loss}^t}{\partial W}$$

where, α and β are learning rate parameters; and after iterative updating, obtaining a learned weighted matrix W, X and H being able to be used simultaneously to estimate the missing data $\hat{X}$:

$$\min_{U,V} \frac{1}{2} \left\| M \odot \left(H - UV^T\right)\right\|^2 + \frac{1}{2}\left\| W \odot N \odot \left(H - UV^T\right)\right\|^2 + \lambda\|U\|^2 + \lambda\|V\|^2$$

$$\hat{X} = M \odot X + (1 - M) \odot UV^T$$

5 where, $\lambda$ represents a penalty item parameter, and U and V represent two sub-matrices decomposed from an original matrix;

step 4, self-view velocity aggregation: by using the filled velocity $\hat{X}$ calculated in the step 3, quantizing, by the processor, spatial dependences between different road sections according to the historical velocity H, and collecting, by the processor, neighbor information to obtain an aggregated roadside pedestrian velocity data $V_d$ and road mobile navigation velocity data $V_w$; and step 5, multi-view velocity fusion: according to the aggregated roadside pedestrian velocity data $V_d$ and the road mobile navigation velocity data $V_w$, fusing, by the processor, multi-source velocity data by using a multi-layer perceptron according to a determination whether a time stamp and current velocity data are filled data, to obtain a fusion velocity $\hat{Y}$, and finally correcting, by the processor, the fusion velocity according to a feature of a road type to obtain a fine-grained large-scale urban traffic estimated velocity $\hat{Y}'$, wherein the road type includes road sections, main road, secondary road, tertiary road and other road.

2. The urban traffic velocity estimation method based on multi-source crowd sensing data according to claim 1, wherein the step 1 specifically comprises: obtaining the road navigation data by filtering a mobile application with location-based services usage list in original data; and by filtering a scanned wireless communication signal list in the original data, obtaining the roadside pedestrian data according to a determination whether there is a vehicle-mounted wireless communication signal in the list.

3. The urban traffic velocity estimation method based on multi-source crowd sensing data according to claim 1, wherein the step 2 specifically comprises: by using the data obtained by filtering in the step 1, projecting trajectory data into a road network by using a hidden Markov road network matching algorithm, so as to obtain the current velocity X of each road section in different time periods.

4. The urban traffic velocity estimation method based on multi-source crowd sensing data according to claim 1, wherein the step 4 specifically comprises: capturing a spatial correlation between adjacent roads by using the self-view velocity aggregation, and aggregating information of neighbor road sections correlated to a central road section; firstly, calculating a spatial correlation $e_{i,j}$ between a road section i and a road section j according to a historical velocity matrix, and keeping correlated parts and ignoring irrelevant information:

$$e'_{i,j} = \sqrt{\sum\left(H_{i,:} - H_{j,:}\right)^2}, \; j \in \text{the set of neighboring connected roads for } i$$

$$e_{i,j} = \begin{cases} +\infty, \; e'_{i,j} \geq \text{threshold} \\ e'_{i,j}, \; e'_{i,j} \leq \text{threshold} \end{cases}$$

then, calculating a fusion coefficient $a_{i,j}$ between the road sections according to the spatial correlation $e_{i,j}$, and then obtaining the roadside pedestrian velocity data $V_d$ and the road mobile navigation velocity data $V_w$ after a self-view aggregation:

$$a_{i,j} = \frac{\exp\left(-e_{i,j}/k\right)}{\sum_{j=N_i}\left(-\dfrac{e_{i,j}}{k}\right) + \varepsilon}$$

$$V_{i,} = \left(1 - \sum_{j=N_i}\frac{a_{i,j}}{2}\right) * \hat{X}_{i,:} + \sum_{j=N_i}\frac{a_{i,j}}{2} * \hat{X}_{j,:}$$

where, $\varepsilon$ represents a minimal constant to prevent an overflow, k represents a constant scaling value, $N_i$ represents a set of neighboring connected road sections i, and $V_i$, uniformly represents a feature representation of an i-th row, i.e., road section i of the roadside pedestrian velocity data $V_d$ and the road mobile navigation velocity data $V_w$.

5. The urban traffic velocity estimation method based on multi-source crowd sensing data according to claim 1, wherein the step 5 specifically comprises: fusing the multi-source velocity data by using multi-view velocities, according to a determination whether a feature representing the time stamp is a filled data feature $F_d$ and whether the current velocity data is a filled data feature $F_w$, then passing the features through an embedding layer and splicing the features, and according to the aggregated roadside pedestrian velocity data $V_d$ and road mobile navigation velocity data $V_w$ obtained in step 4, obtaining the fusion velocity $\hat{Y}$ through the multi-layer perceptron:

$$Z = \text{Embedding}(Concat(F_d, F_w))$$

$$\hat{Y} = MLP(Concat(Z, V_d, V_w))$$

finally, correcting the estimated velocity according to the features of the road types, obtaining a velocity distribution of each type of road according to the historical data, regarding the velocity distribution as a normal distribution, and correcting the velocity falling at a tail of the distribution to obtain a final estimated velocity $\hat{Y}'$.

* * * * *